Dec. 10, 1968  F. F. HOLUB  3,415,780
POLYAMIDE ESTERS PREPARED FROM N,N'-DIARYL ARYLENE
DIAMINES, DIPHENOLS AND AROMATIC DIACYL HALIDES
Filed March 17, 1965
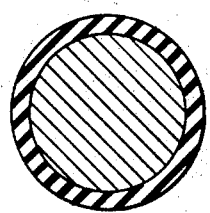
Inventor:
Fred F. Holub,
by Joseph T. Cohen
His Attorney.

United States Patent Office 3,415,780
Patented Dec. 10, 1968

3,415,780
POLYAMIDE ESTERS PREPARED FROM N,N'-DI-
ARYL ARYLENE DIAMINES, DIPHENOLS AND
AROMATIC DIACYL HALIDES
Fred F. Holub, Scotia, N.Y., assignor to General Electric
Company, a corporation of New York
Filed Mar. 17, 1965, Ser. No. 440,388
16 Claims. (Cl. 260—47)

ABSTRACT OF THE DISCLOSURE

An N,N'-diaryl arylene diamine and a diphenol are coreacted with an aromatic diacyl halide to produce an aromatic N-arylamide ester polymer. These polymers have exceptional resistance to heat and are, therefore, useful for the making of shaped articles or coatings on substrates, for example, insulation on an electrical conductor, which are capable of withstanding exposure to high temperatures.

---

This invention relates to synthetic polymeric compositions. More particularly the invention relates to aromatic N-arylamide ester polymers having very high melting points, exceptional resistance to heat, and a high degree of solubility in organic solvents, which polymers are formed by the reaction of an N,N'-diaryl arylene diamine, an aromatic diacyl halide, and a diphenol.

The polymers to which this invention is directed are composed of recurring structural units of the formula:

I $$A \quad \left[ \begin{array}{c} \phantom{x} \\ -N-R'-N-\overset{O}{\underset{\|}{C}}-R''-\overset{O}{\underset{\|}{C}}- \\ \phantom{-}\underset{Ar}{|} \phantom{xx} \underset{Ar}{|} \end{array} \right]$$

and

II $$B \quad \left[ -O-R'-O-\overset{O}{\underset{\|}{C}}-R''-\overset{O}{\underset{\|}{C}}- \right]$$

which are joined into long molecular chains in a wide variety of fashions; e.g., they can be in a random pattern such as: A—B—A—A—A—B—A—B—B—; a block pattern such as: A—A—A—A—A—B—B—B—B—A—A—A—A—A—A—; or a regular pattern such as: A—A—A—A—B—A—A—A—A—B—A—A—A—B; etc. The pattern of the units and the ratio of A to B units can be controlled by the order of reaction and amount of reactants.

The polymer molecules containing both these units can be represented by the formula:

III $$\left\{ \left[ \begin{array}{c} -N-R'-N-\overset{O}{\underset{\|}{C}}-R''-\overset{O}{\underset{\|}{C}}- \\ \underset{Ar}{|} \phantom{xx} \underset{Ar}{|} \end{array} \right] \quad \left[ -O-R'-O-\overset{O}{\underset{\|}{C}}-R''-\overset{O}{\underset{\|}{C}}- \right] \right\}_x$$

A                              B where unit A comprises from 5 to 95 mol percent of the total molar concentration of A and B, and $x$ is a whole number in excess of 25, e.g., from 50 to 1000 or more. The molecular weights, when measured by usual means, for example, by light scattering, may range from 5000 to 2,000,000 or more. In formulas I to III Ar is a monovalent aryl nucleus, e.g., phenyl, naphthyl, biphenyl radicals, etc., substituted nuclearly aryl radicals, e.g., substituted with inert substituents such as for instance, halogens, e.g., chlorine, bromine, fluoride, etc.; R' is a radical selected from the group consisting of:

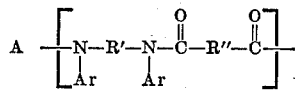, 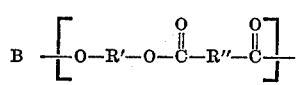

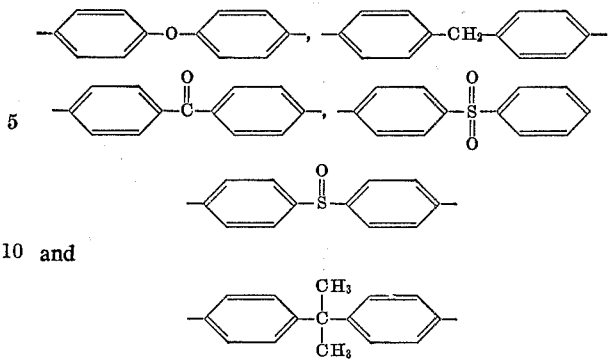

and

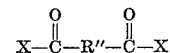

radicals; and R" is the residue of an aromatic diacyl halide. The R' radicals may be the same or different.

In the designation of the novel polymers of this invention reference has been made to the polymers as being completely aromatic. More precisely, it is intended to define by this language polymers which have no hydrogen bonded to nitrogen but wherein all hydrogen is included only in an aromatic ring. If the nitrogen is substituted with a substituent other than an aromatic group, for example, hydrogen or an alkyl radical, the oxidation resistance, that is the resistance to deterioration at elevated temperatures of from 250 to 350° C. for times of 1 to 10 hours is significantly reduced.

As broadly suggested above, the present polymers may be prepared by the reaction of an N,N'-diaryl phenylenediamine, an aromatic diacyl halide, and a diphenol to give polymerizable products which are herein designated as "N-arylamide ester polymers."

Inert solvents are advantageously employed for satisfactory preparation of the present polymers. Such representative solvents include trichlorobiphenyl, tetrachloroethane, monochlorobiphenyl, dichlorobiphenyl, biphenyl, trichlorobenzene, diphenyl ether, and other high boiling (above 125° C.) aromatic or aliphatic solvents.

The N,N'-diaryl phenylene diamines which may be successfully employed in preparing the subject polymers may be an N,N'-diaryl para-phenylenediamine or an N,N'-diaryl meta-phenylenediamine. Representative examples of these compounds include N,N'-diphenyl-p-phenylenediamine; N,N' - dinaphthyl - p-phenylenediamine; N,N'-diphenyl - m - phenylenediamine; N,N' - dinaphthyl - m-phenylenediamine, etc. Also included within the scope of the diamines useful in this invention, as indicated in the formula given above, are diamines of the structure:

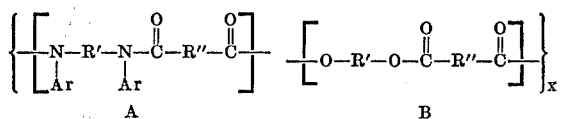

where R is a member of the class consisting of

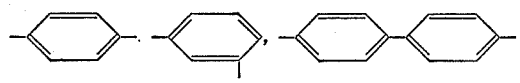

and Ar has the meaning given above.

The aromatic diacyl halides useful in preparing the polymers of this invention have the formula:

$$X-\overset{O}{\underset{\|}{C}}-R''-\overset{O}{\underset{\|}{C}}-X$$

and are advantageously represented by the formula:

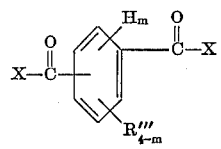

where R″ has the meaning above, X is a halogen e.g., chlorine, bromine, etc., R‴ is a member selected from the class consisting of alkyl and alkoxy radicals of from 1 to 4 carbon atoms, and halogens, m is a whole number from 0 to 4, inclusive, and the acyl halide radicals

are present on the ring in various positions, e.g., ortho, para and meta to each other. Included among such phthaloyl halides are, e.g., orthophthaloyl chloride; isophthaloyl chloride; lower alkyl isophthaloyl chlorides, such as methyl, ethyl, propyl, t-butyl etc., substituted isophthaloyl chlorides, dimethyl, trimethyl, tetramethyl, diethyl, triethyl, and tetraethyl substituted isophthaloyl chlorides; 2-methyl-4-ethyl isophthaloyl chloride, 2-methyl-4-ethyl-5-propyl isophthaloyl chloride, 5-tertiary butyl isophthaloyl chloride; methoxy-, ethoxy-, propoxy-, butoxy-, etc., isophthaloyl chlorides; dimethoxy-, trimethoxy-, tetramethoxy, and diethoxyisophthaloyl chlorides; 2-methoxy-4-ethoxy isophthaloyl chloride; chloro-, bromo-, and fluoro-isophthaloyl chlorides; di-halo isophthaloyl chlorides, such as dichloro-, dibromo, difluoro-, or chlorobromo-, chlorofluoro-isophthaloyl chlorides; similar trihalo and tetrahalo-isophthaloyl chlorides; unsubstituted and substituted terephthaloyl halides corresponding to the substituted isophthaloyl halides described above and including lower alkyl, lower alkoxy, and halogen substituted terephthaloyl chlorides including terephthaloyl chloride, methyl-, ethyl-, propyl-, butyl-, etc., substituted terephthaloyl chlorides; methoxy-, ethoxy-, propoxy-, butoxy-, etc., substituted terephthaloyl chlorides; chloro-, bromo-, dichloro-, chlorobromo-, etc., substituted terephthaloyl chlorides; etc. Mixtures of the diacyl halides may also be used to the extent of from 5 to 95 mol percent of one diacyl compound to 95 to 5 mol percent of one or both of the other two diacyl halides.

In addition to the single ring diacyl chlorides specified above, multiple ring diacyl chlorides in which the acyl halide groups are oriented meta or para with respect to each other are also useful in this invention. Exemplary of such compounds are 4,4′-oxydibenzoyl chloride, 4,4′-sulfonyldibenzoyl chloride, 4,4′-dibenzoyl chloride, 3,3′-oxydibenzoyl chloride, 3,3′-sulfonyldibenzoyl chloride, and 3,3′-dibenzoyl chloride, the corresponding bromides and fluorides, and similar compounds in which one or both of the aromatic rings contains one or more or a combination of lower alkyl, lower alkoxy, halogen, nitro, sulfonyl, lower carbalkoxy groups.

The diphenols useful in preparing the novel polymers of this invention include, but are not limited to, hydroquinone, resorcinol, p,p′-isopropylidenediphenol; p,p′-dihydroxydiphenyl ether; p,p′-dihydroxybiphenyl, p,p′-dihydroxydiphenyl sulfone, etc.

In accordance with this invention, an N,N′-diaryl phenylene diamine, an aromatic diaryl halide and a diphenol are coreacted to produce a high molecular weight stable polymer which is soluble in organic solvents. Without intending to be limited by any theory, the high degree of stability, particularly heat stability, is believed to be derived from the absence of hydrogen atoms bonded to any nitrogen atom in the molecular chain. The structure of the polymer is confirmed in conventional manner as by infrared spectrum analysis.

In the preparation of the polymers of this invention, the aromatic diacyl halide, the diamine and the diphenol are dissolved in a solvent and heated to a temperature in the range of 125 to 350° C., advantageously under reflux conditions for a period of ¼ to 10 hours or more. The proportions of diamine and diphenol may vary from 5 to 95 mole percent of the diamine, and from 95 to 5 mole percent of the diphenol. The diacyl halide is added in an amount equal to at least the total molar concentration of the diamine and the diphenol. Obviously greater proportions may be used. The quantity of ingredients charged should take into account process losses.

In order that those skilled in the art may more fully understand the invention, the following examples are given by way of illustration and not by way of limitation:

EXAMPLE I

A mixture of N,N′-diphenyl-p-phenylenediamine (2.6 g.), hydroquinone (4.4 g.), isophthaloyl chloride (10.15 g.) and trichlorobiphenyl (130 g.) was heated for one hour at 330–340° C. Acetone was used to remove the solvent from the polymer and the polymer was then dried. The product obtained was molded at 350° C. into a film having a room temperature tensile strength of 9,590 p.s.i. and an elongation of 85%; at 200° C. the polymer had a tensile strength of 2,562 p.s.i. and an elongation of 320%.

The polymer of this example is composed of recurring units of the formula:

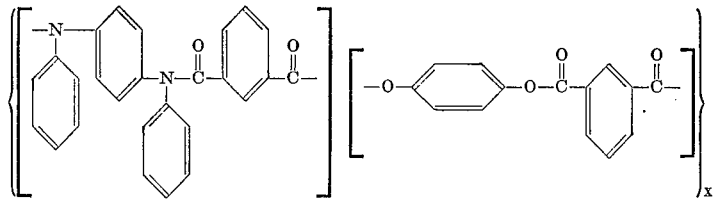

where $x$ is a whole number in excess of 25.

EXAMPLE II

A mixture of 6.18 g. bisphenol-A (p,p′-isopropylidenediphenol), 0.78 g. N,N′-diphenyl-p-phenylenediamine, 6.09 g. terephthaloyl chloride and 43.44 g. of trichlorobiphenyl was stirred and heated as follows: between 26° and 325° C. for 30 minutes and at 325° C. for 30 minutes. The solution was diluted to approximately 5% solids with trichlorobiphenyl. The resulting polymer was precipitated with acetone, washed thoroughly with boiling acetone and filtered to dryness. The intrinsic viscosity of the polymer at 25° C. in cresol was 1.05.

The polymer product of this example is composed of recurring units of the formula:

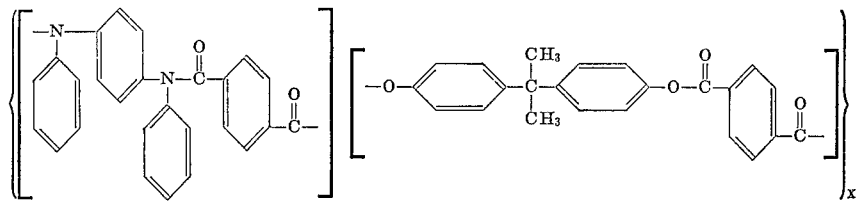

where $x$ is a whole number in excess of 25.

EXAMPLE III

A mixture of 1.55 g. hydroquinone, 3.91 g. N,N′-diphenyl-p-phenylenediamine, 6.09 g. terephthaloyl chloride, and 37.4 g. trichlorobiphenyl was stirred and heated as follows: between 26° C. and 325° C. for 30 minutes and at 325° C. for 60 minutes. The resulting polymer solution was clear and extremely viscous. It was diluted to approximately 5% solids with trichlorobiphenyl. The polymer was precipitated with acetone, washed thoroughly with boiling acetone, and filtered to dryness. The intrinsic viscosity of the polymer at 25° C. in cresol was 0.69. The polymer is composed of recurring units of the formula:

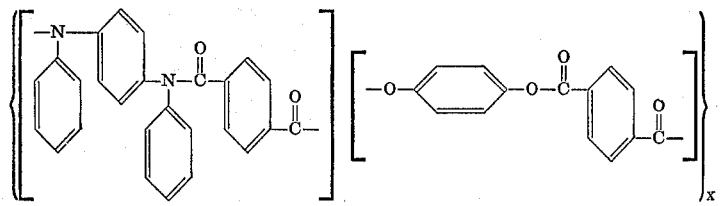

where $x$ is a whole number in excess of 25. This polymer which was composed of about equimolar concentrations of diamine and hydroquinone residues melted somewhat above 365° C. When the molar concentration of the hydroquinone is 70 mol percent or higher, the melting point is above 500° C.

EXAMPLE IV

A mixture of 0.55 g. hydroquinone, 1.30 g. N,N'-diphenyl-m-phenylenediamine, 2.03 g. isophthaloyl chloride and 40.0 g. of trichlorobiphenyl was stirred and heated as follows: between 26° C. and 300° C. for 10 minutes, and at 300–325° C. for 20 minutes. The resulting polymer was precipitated with methanol, washed with methanol and dried. The polymer was soluble in tetrachloroethane. Flexible films were made on evaporation of the solvent. The polymer product of this example is composed of recurring units of the formula:

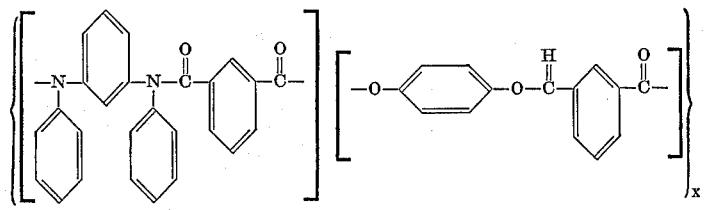

where $x$ is a whole number in excess of 25.

EXAMPLE V

A mixture of 1.25 g. p,p'-dihydroxydiphenyl sulfone, 2.03 g. isophthaloyl chloride, 1.30 g. N,N'-diphenyl-p-phenylenediamine and 40.0 g. trichlorobiphenyl was stirred and heated for 30 minutes at 300–315° C. The polymer precipitated from trichlorobiphenyl on cooling to room temperature. It was dissolved in tetrachloroethane and precipitated in methanol to yield a fibrous white solid polymer melting at 300–312° C. A film cast from a solution of the polymer in tetrachloroethane was strong and flexible. The polymer was composed of recurring units of the formula:

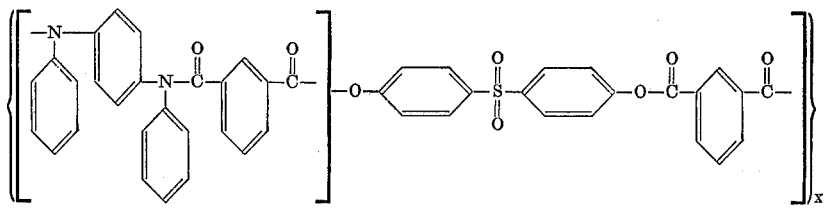

where $x$ has the meaning above.

EXAMPLE VI

In this example, a mixture of 1.68 g. of N,N'-diphenyl benzidine, 0.55 g. of hydroquinone, 2.03 g. of terephthaloyl chloride and 15.0 g. of trichlorobiphenyl was heated with stirring at 100° C. for 10 minutes, then 10 minutes at 200° C. and then for 20 minutes at 300° C. On cooling a viscous polymer solution was obtained. This polymer (which was diluted with tetrachloroethane) was precipitated by the addition of acetone. Strong, flexible films could be cast from a solution of this polymer in tetrachloroethane. This polymer is composed of recurring structural units of the formula:

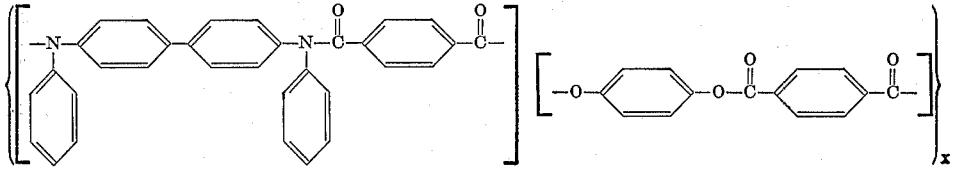

where $x$ has the meaning above.

EXAMPLE VII

In this example, a mixture of 1.86 g. p,p'-dihydroxybiphenyl, 1.30 g. N,N'-p-phenylenediamine, 3.05 g. isophthaloyl chloride and 40.0 g. trichlorobiphenyl were gradually heated to 300° C. The mixture was then heated for 20 minutes at 300–325° C., yielding a viscous polymer solution. On cooling, the polymer was separated from the reaction solvent with acetone, yielding a white solid polymer melting at 330–340° C. It could be fused into a flexible film at 340° C. The polymer is composed of recurring structural units of the formula:

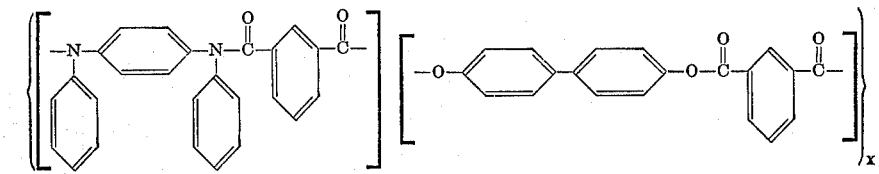

where $x$ has the meaning above.

The polymers of this invention are conveniently suited as insulation for conductors. Thus as illustrated in the drawing, FIG. 1 is a cross-sectional view of a conductor comprising a conducting core 1 of copper, aluminum, copper alloy and the like, fabricated with insulation 2 comprising one of the polymer products of this invention.

A conductor insulated with one of the polymers of this inventoin can be prepared by direct extrusion of the polymer of Example VII through a die onto a nickel-coated copper wire at around 360° C. followed by quenching in water. The amorphous polymer on the wire is crystallized by heating at 300° C. for two hours to form an extremely tough, adherent electrical insulation on the wire. A second method which is useful for preparing an insulated conductor involves wrapping either an aluminum or copper wire with an amorphous, continuous 1-inch wide tape of one of the N-phenylamide esters of the invention. The tape is wrapped so as to overlap the edges by about ⅛ inch. The resulting wrapped conductor when heated at about 350° C. for ½ hour causes the tape to fuse and form a tightly adherent insulation around the wire. Conductors may also be coated with solutions of the polymers.

The polymers of this invention are suitable for a wide variety of uses. To mention several, they may be used as laminating resins for glass cloth and metal, for high temperature coating materials, and as enamel compositions for insulation. More specifically, these polymers may be coated on metallic or nonmetallic substrates by flame spraying, melt casting or by casting while dissolved in one of the solvents in which made or in other solvents in which they are soluble. The hot solution of the solvent may be forced through a spinneret into a heated drying tower, preferably maintained at reduced pressure, to form filaments or fibers, or the molten polymer may be forced through spinnerets by well known techniques to form filaments and fibers. The fibers so formed may be formed into yarns or used to form fiber matting. Alternatively, the polymers may be cast from solution or from the melt of the polymer, extruded through a die, or otherwise sheeted to form a continuous film. The compositions may also be extruded or applied from solution directly onto electrical conductors, such as a wire, or as an overcoat on an insulated conductor, to form insulated electrical conductors. The compositions may also be injection, transfer or compression molded under heat and pressure to form intricately shaped objects of wide utility, dependent on the particular object molded. Other uses for films and the fabrics or mats made from the fibers include a wide variety of electrical applications, that is, as slot insulation for motors, primary insulation for heat-resistant wire, pressure-sensitive electrical tape, split mica insulating tape, i.e., mica sheet laminated between film, small condensers, metal foil laminated to film or film having an adherent metal coating, weather resistant electrical wire, i.e., a conductor wrapped with film coated with asphalt, as a wrapping for submerged pipe to insulate against ground currents, as primary and secondary insulation in transformer construction, as a dielectric in electroluminescent structures, etc. The compositions may also be used to laminate or adhere glass and metal surfaces to themselves or to each other, or to other similar surfaces; for example, two glass surfaces may be laminated together by inserting an interlayer of the polymer either as a powder, as a film, or as a surface coating between two glass surfaces to be joined. Pressure or vacuum is applied to the assembly after it is heated to the softening point of the polymer to firmly adhere the two glass surfaces together. This process may be used for forming a vacuum-tight seal between two mating glass objects such as for making a cathode ray tube or other device.

Other valuable uses for the polymers of this invention will be readily apparent to those skilled in the art. Also, many apparently widely different embodiments such as the adding of pigments, fillers, stablizers, plasticizers, etc., may be made to modify the properties of the polymers.

Various other polymers may be blended in solution with the polymers of the invention such as aromatic polyamide acids, polyimides, polybenzimidazoles, aromatic polyesters and other high temperature resins to yield mixed polymer blend compositions. Also, as previously indicated, various plasticizers such as polychlorobiphenyl, polyethers, polyesters, etc., may be employed for ease of fabrication.

It will be apparent to those skilled in the art that various modifying agents such as polymer chain terminators, which will increase the stability, the polymers of the instant invention can be added. Thus, one can incorporate, in amounts ranging from 1 to 5 mol percent, with the reactants used to make the wholly aromatic polymers of the present invention, compounds such as diphenylamine, phenol, dinaphthylamine, benzoyl chloride, 4-phenyl benzoyl chloride, etc. The addition of these chain terminators helps to control the molecular weight of the polymer.

It is to be understood that changes may be made in the particular embodiments of the invention described which are within the full intended scope of the invention as defined by the appended claims.

What I claim as new and desire to secure by Letters Patent of the United States is:

1. A fusible polymer composed of interspersed units of the formula $$\left\{\left[\begin{array}{c}-N-R'-N-\overset{O}{\underset{\|}{C}}-R''-\overset{O}{\underset{\|}{C}}-\\ \phantom{-N-}Ar\phantom{-N-}Ar\end{array}\right]\left[-O-R'-O-\overset{O}{\underset{\|}{C}}-R''-\overset{O}{\underset{\|}{C}}-\right]\right\}_x$$

wherein Ar is a monovalent aryl radical selected from the group consisting of phenyl, naphthyl and biphenyl radicals, and halogen-substituted derivatives of said aryl radicals, R' is a radical selected from the group consisting of:

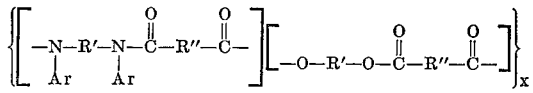

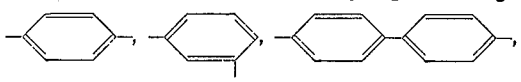

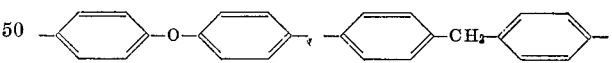

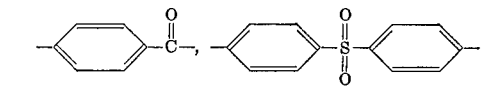

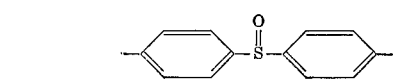

and

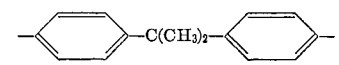

radicals, R'' is the residue of an aromatic diacyl halide, x is a whole number in excess of 25.

2. A fusible polymer represented by the formula:

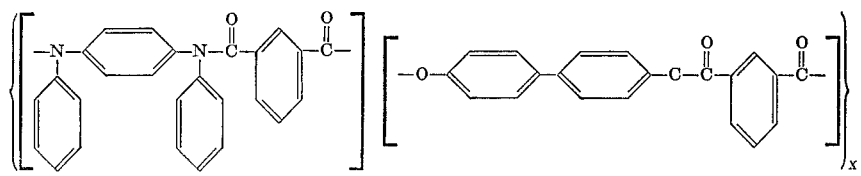

where x is a whole number in excess of 25.

3. A fusible polymer represented by the formula:

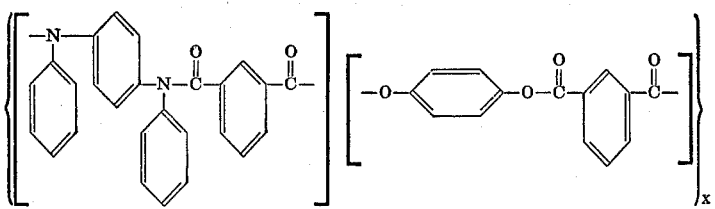

wherein x is a whole number in excess of 25.

4. A fusible polymer represented by the formula:

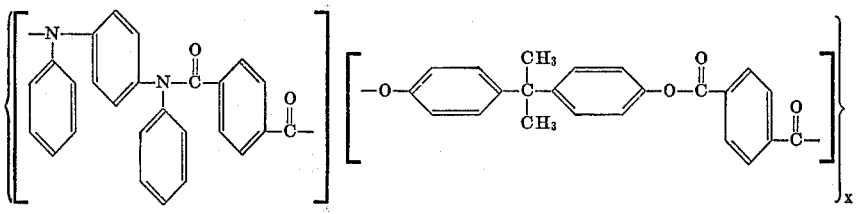

wherein x is a whole number in excess of 25.

5. A fusible polymer represented by the formula:

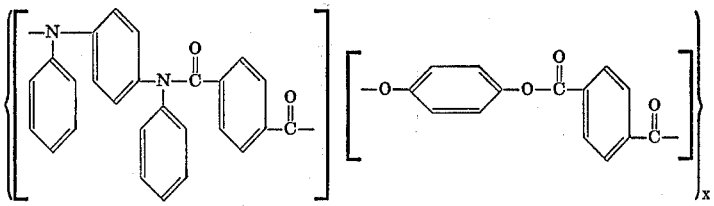

wherein x is a whole number in excess of 25.

6. A fusible polymer represented by the formula:

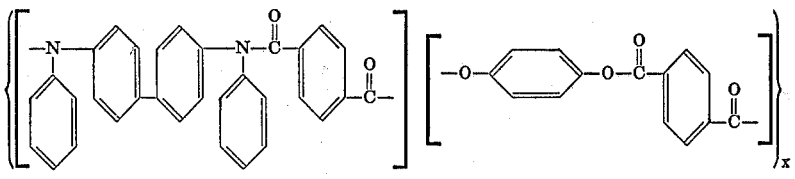

wherein x is a whole number in excess of 25.

7. A fusible polymer represented by the formula:

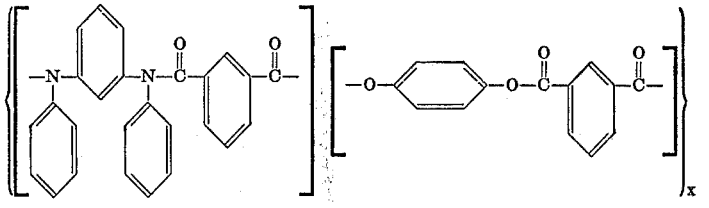

wherein x is a whole number in excess of 25.

8. A fusible polymer represented by the formula:

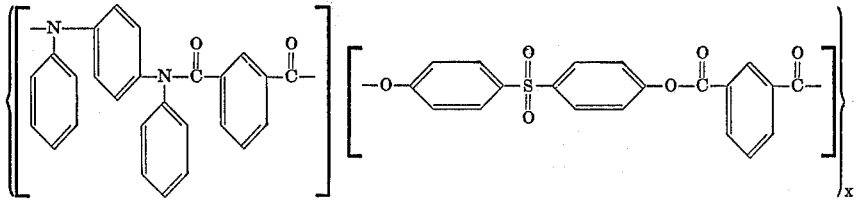

wherein x is a whole number in excess of 25.

9. The process for making the polymers of claim 1 which comprises effecting reaction between an aromatic diacyl halide, an N,N'-diaryl phenylenediamine and an aromatic dihydroxy compound by heating a solution of said reactants to a temperature in the range of 125–350° C.

10. The process as in claim 9 in which the phenylene diamine is N,N'-diphenyl-p-phenylenediamine, the diaryl halide is isophthaloyl chloride and the aromatic dihydroxy compound is hydroquinone.

11. The process as in claim 9 in which the phenylene diamine is N,N'-diphenyl-p-phenylenediamine, the diaryl halide terephthaloyl chloride and the aromatic dihydroxy compound is p,p'-isopropylidene-diphenol.

12. The process as in claim 9 in which the phenylene diamine is N,N'-diphenyl-p-phenylenediamine, the diaryl halide is terephthaloyl chloride and the aromatic dihydroxy compound is hydroquinone.

13. The process as in claim 9 in which the phenylene diamine is N,N'-diphenyl-m-phenylenediamine, the diaryl halide is isophthaloyl chloride and the aromatic dihydroxy compound is hydroquinone.

14. The process as in claim 9 in which the phenylene diamine is N,N'-diphenyl-p-phenylenediamine, the diaryl halide is isophthaloyl chloride and the aromatic dihydroxy compound is p,p'-dihydroxydiphenyl sulfone.

15. The process as in claim 9 in which the phenylene diamine is N,N'-diphenyl benzidine, the diaryl halide is terephthaloyl chloride and the aromatic dihydroxy compound is hydroquinone.

16. An insulated, electrical conductor comprising an electrical conductor having insulation thereon composed of a polymer represented by the formula of claim 1.

(References on following page)

References Cited

UNITED STATES PATENTS 3,272,774  9/1966  Moyer _____ 260—47
3,296,201  1/1967  Stephens _____ 260—47

WILLIAM H. SHORT, *Primary Examiner.*

L. LEE, *Assistant Examiner.*

U.S. Cl. X.R.

260—49, 75, 78; 117—132, 161, 232; 161—190; 260—33.8, 33.6, 33.2, 79.3, 65

UNITED STATES PATENT OFFICE
CERTIFICATE OF CORRECTION

Patent No. 3,415,780                                        December 10, 1968

Fred F. Holub

It is certified that error appears in the above identified patent and that said Letters Patent are hereby corrected as shown below:

Column 2, lines 3 to 5, the right-hand formula should appear as shown below:

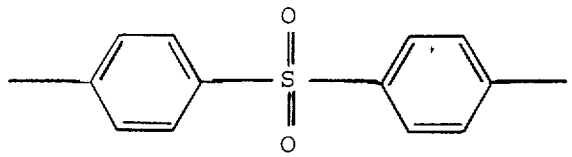

Column 3, lines 6 to 8, the formula should appear as shown below:

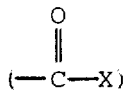

line 74, "diaryl" should read -- diacyl --. Column 8, lines 52 to 54, the left-hand formula should appear as shown below:

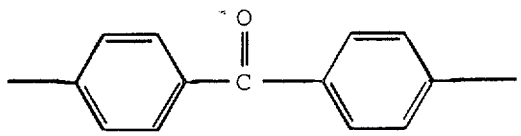

Signed and sealed this 10th day of March 1970.

(SEAL)
Attest:

EDWARD M. FLETCHER, JR.                                     WILLIAM E. SCHUYLER, JR
Attesting Officer                                                Commissioner of Patents